United States Patent
Chuang

(10) Patent No.: US 11,705,126 B2
(45) Date of Patent: Jul. 18, 2023

(54) BARRIER-FREE INTELLIGENT VOICE SYSTEM AND CONTROL METHOD THEREOF

(71) Applicant: Lien Hao Chuang, Kaohsiung (TW)

(72) Inventor: Lien Hao Chuang, Kaohsiung (TW)

( * ) Notice: Subject to any disclaimer, the term of this patent is extended or adjusted under 35 U.S.C. 154(b) by 255 days.

(21) Appl. No.: 17/236,366

(22) Filed: Apr. 21, 2021

(65) Prior Publication Data

US 2021/0335359 A1 Oct. 28, 2021

(30) Foreign Application Priority Data

Apr. 22, 2020 (TW) ................................ 109113480

(51) Int. Cl.
| | |
|---|---|
| *G10L 15/00* | (2013.01) |
| *G10L 15/22* | (2006.01) |
| *G10L 15/30* | (2013.01) |
| *G10L 17/22* | (2013.01) |
| *G10L 15/08* | (2006.01) |
| *G10L 15/02* | (2006.01) |

(52) U.S. Cl.
CPC .............. *G10L 15/22* (2013.01); *G10L 15/08* (2013.01); *G10L 15/30* (2013.01); *G10L 17/22* (2013.01); *G10L 15/02* (2013.01); *G10L 2015/088* (2013.01)

(58) Field of Classification Search
CPC combination set(s) only.
See application file for complete search history.

*Primary Examiner* — Vu B Hang
(74) *Attorney, Agent, or Firm* — Muncy, Geissler, Olds & Lowe, P.C.

(57) ABSTRACT

A barrier-free intelligent voice system and a method for controlling thereof, wherein multiple words are recognized from a voice audio to create multiple independent semantic units. Meanwhile, the system can continuously determine whether they are one of multiple voice tags created by the user. Thereafter, a target object, a program command, and a remark corresponding to the voice tag can be determined based on the successfully compared voice tag combination. Accordingly, a corresponding program can be started or a remote device can be triggered to operate. The present disclosure can be regarded as an AI intelligent voice processing engine. By allowing users to define different types of voice tag combinations, it can eliminate the grammatical and semantic analysis of natural language processing, eliminate speech translation differences and errors between different languages, effectively reduce the amount of calculations, increase the processing speed of the system, minimize system judgment errors.

10 Claims, 13 Drawing Sheets

BARRIER-FREE INTELLIGENT VOICE SYSTEM AND CONTROL METHOD THEREOF

BACKGROUND OF INVENTION

(1) Field of the Present Disclosure

The present disclosure relates to an audio recognition, and more particularly to a barrier-free intelligent voice system and a method for controlling thereof, through which multiple independent semantic units can be recognized from a voice audio and successively compared whether they are one of multiple voice tags created by the user. According to the compared voice tags (which can represent a term, a name, a title, a code of a certain subject or information, a single or a combined command, a program, a voice message, a recorded message, etc.), a voice command (also called a voice code) corresponding to the voice audio can be determined to activate the corresponding program or trigger the action of other controlled devices.

(2) Brief Description of Related Art

With the development of technology, mobile devices with voice recognition systems have become increasingly popular. Currently, most voice recognition systems use language comprehension technology for users to directly interact with mobile devices in natural language. For example, the user can issue continuous voice commands "buy a ticket of China Airlines to Tokyo next Wednesday" to the mobile device. However, if the voice recognition system is designed to reach the level of speech understanding, it needs to perform a grammatical analysis (for example, using a syntax analyzer) and a semantic interpretation (for example, using a semantic analyzer) on the continuous voice commands such that, after performing part-of-speech tagging for each word of the continuous voice commands, extracting stemming, forming a Parser tree, and assigning a semantic role to each word of the Parser tree, the analysis of the semantic meaning of the entire sentence voice command will cause a larger amount of electronic calculation.

In addition, it is usual that the grammatical structure of such continuous voice commands will follow the restrictions of specific grammatical rules (including syntax and morphology). Meanwhile, the grammatical structures of different languages are different. Moreover, the continuous voice commands sent by the user can be complicated, or even with a lot of redundant words. Also, there can be a slight pause when the user gives the continuous voice commands. If grammatical structure used by the user is not correct enough, or the user's personal accent is different, or the user uses different single and mixed languages, it may affect the accuracy of the voice recognition system. At the same time, it also creates a certain degree of difficulty for training natural language processing models (NLP).

Furthermore, if the voiceprint recognition technology is not used, the existing voice recognition system cannot distinguish from the user's voices whether it has the authority to perform specific actions. Therefore, for the voice recognition system that generally uses language comprehension technology, how to propose a method and a voice recognition system that can reduce the amount of voice recognition calculations, reduce the impact of grammatical structure on the voice recognition system, can be used without barriers, can verify usage rights, confidentiality, and fulfill the anti-theft features is still a problem to be solved.

SUMMARY OF INVENTION

It is a primary object of the present disclosure to provide a method for barrier-free intelligent voice system and a method for controlling thereof, wherein the method includes following steps:

analyzing a voice audio, wherein a voice recognition unit is connected to a voice database, and perform a phonetic analysis on a voice audio received by a voice receiving unit to identify a plurality of phones therefrom, and then perform a morphological analysis on the plurality of phones to identify a plurality of words that can be used as independent semantic units;

comparing voice tags, wherein the voice recognition unit is connected to a tag database to determine whether the plurality of words are one of a plurality of target voice tags defined by a mobile device, and whether the plurality of words are one of a plurality of command voice tags defined by the mobile device; and executing a corresponding voice command, wherein, according to the compared target voice tag corresponding to a target object in the tag database and according to the compared command voice tag corresponding to a program command in the tag database, a processor enables the mobile device to execute the program command on the target object.

According to the present disclosure, the barrier-free intelligent voice system comprises:

a voice receiving unit establishing an information link with a processor and provided for receiving a voice audio;

a communication unit establishing an information link with the processor;

a voice database storing a plurality of voice audio samples;

a tag database storing a plurality of target voice tags and command voice tags;

a voice recognition unit establishing an information link with the communication unit, the voice database, and the tag database, the voice recognition unit being provided for receiving the voice audio sent by the voice receiving unit, performing a phonetic analysis on the voice audio to identify a plurality of phones according to a result of reading over the voice database, and performing a morphological analysis on the phones to identify a plurality of independent words;

wherein the voice recognition unit may also, according to the result of reading over the tag database, determine whether the plurality of words are one of the plurality of target voice tags defined by a mobile device and whether the plurality of words are one of the plurality of command voice tags defined by the mobile device; and wherein, if it is the case, the voice recognition unit may, according to the compared target voice tag corresponding to a target object in the tag database and according to the compared command voice tag corresponding to a program command in the tag database, enable the processor of the mobile device via a communication unit to execute the program command on the target object.

DETAILED DESCRIPTION OF PREFERRED EMBODIMENTS

Figure 1:
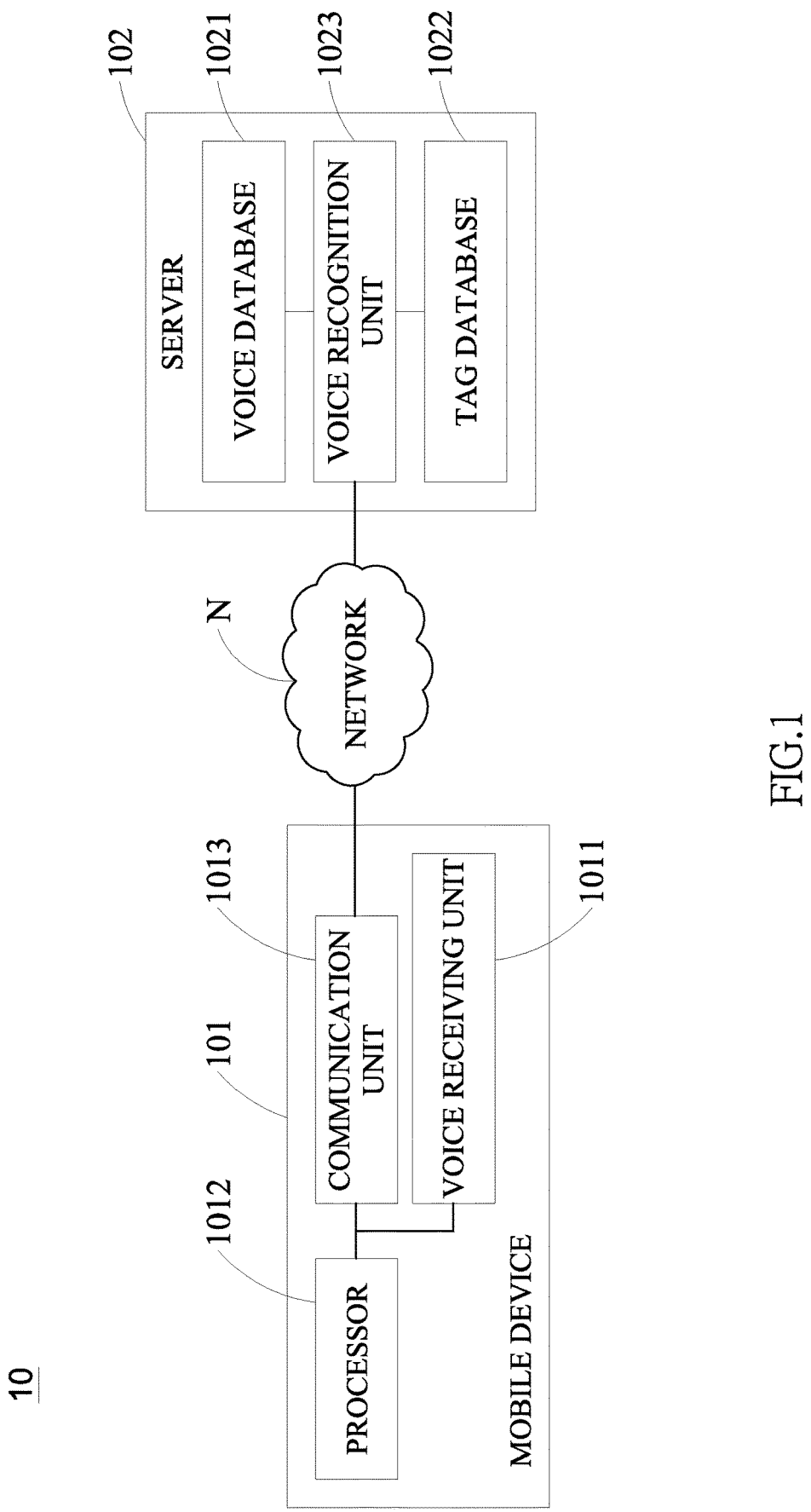
FIG. 1 is a block diagram of an intelligent voice system of the present disclosure.
Figure 2:
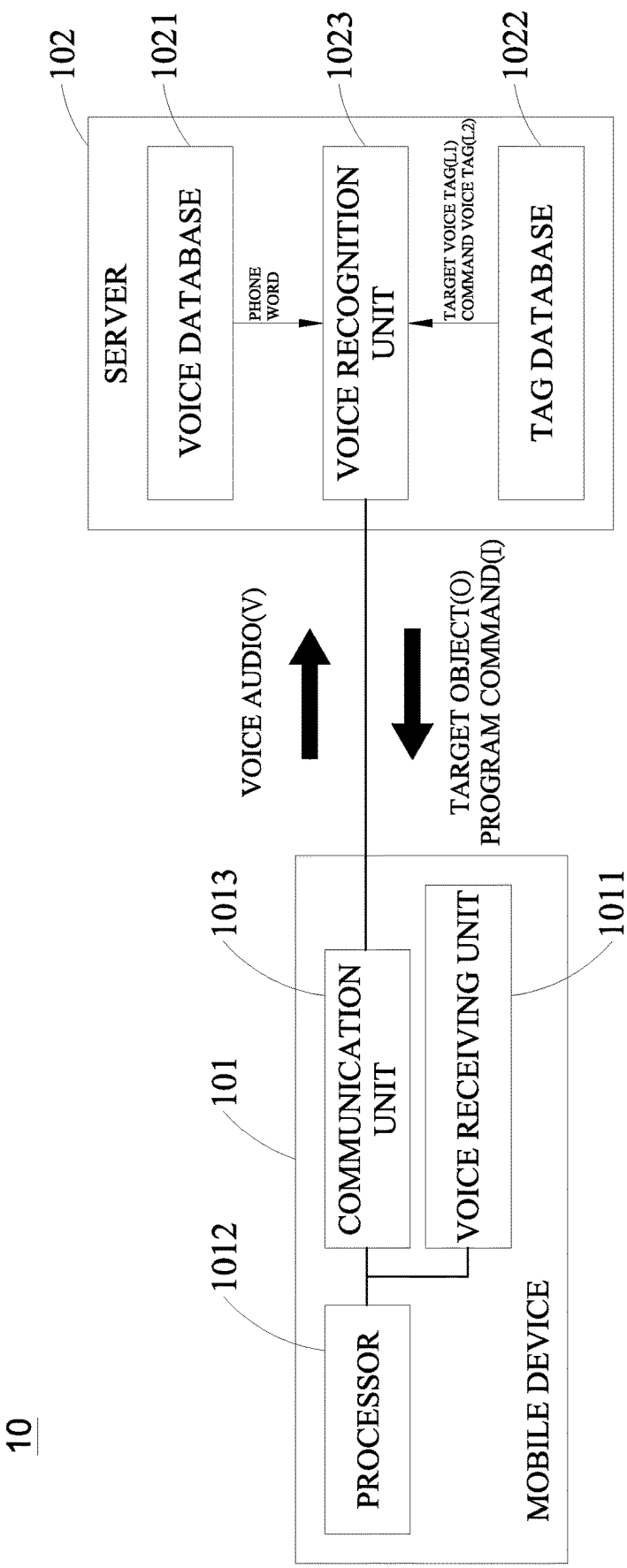
FIG. 2 is a schematic drawing of an information flow of the intelligent voice system of the present disclosure.

As shown in FIG. 1 and FIG. 2, a barrier-free intelligent voice system 10 according to the present disclosure includes:

A voice receiving unit 1011 establishes an information link with a processor 1012 of a mobile device 101 and is provided for receiving a voice audio V. The voice receiving unit 1011 can be a microphone of the mobile device 101 or a wireless earphone in wireless communication with the mobile device 101.

A communication unit 1013 establishes an information link with the processor 1012.

A voice database 1021 stores a plurality of voice audio samples, and each/each group of phone in each voice audio sample corresponds to a word that can be used as an independent semantic unit. The aforementioned voice audio samples can be recognized by the voice recognition unit 1023 according to various initials and various finals of the voice audio V to identify one or more syllables in the voice audio samples. The languages of the aforementioned voice audio samples can be Chinese, English, Cantonese, Japanese, Korean, etc., but should not be limited thereto.

A tag database 1022 stores a plurality of target voice tags L1 and a plurality of command voice tags L2.

A voice recognition unit 1023 establishes an information link with the communication unit 1013, the voice database 1021, and the tag database 1022, respectively. The voice recognition unit 1023 is provided for receiving the voice audio V sent by the voice receiving unit 1011 via a network N, performing a phonetic analysis on the voice audio V to identify a plurality of phones according to a result of reading over the voice database 1021, and performing a morphological analysis on the phones to identify a plurality of independent words. Preferably, after recognizing the above-mentioned plurality of phones, a phonological analysis can be performed on the voice audio V at the same time to identify a phoneme of the phone in the corresponding language. Since the phoneme is considered to be the basic distinctive units of phone, it can help the voice recognition unit 1023 to distinguish the plurality of phones as words.

According to the result of reading over the tag database 1022, the voice recognition unit 1023 can also determine whether the plurality of words are one of the plurality of target voice tags L1 defined by the mobile device 101 and whether the plurality of words are one of the plurality of command voice tags L2 defined by the mobile device 101.

The voice recognition unit 1023 may also, according to the compared target voice tag L1 corresponding to a target object O in the tag database 1022 and according to the compared command voice tag L2 corresponding to a program command I in the tag database 1022, enable the processor 1012 of the mobile device 101 via the communication unit 1013 to execute the program command I on the target object O.

According to this embodiment, the voice receiving unit 1011, the processor 1012, and the communication unit 1013 can all run on the mobile device 101.

According to this embodiment, the voice database 1021, the tag database 1022, and the voice recognition unit 1023 can all run on a server 102. Of course, the server 102 can include a second processor which will not be detailed hereinafter.

The target object O illustrated in FIG. 1 can be a contact information stored in the mobile device 101, such as a contact name, a contact code, and a contact title. Also, the target object O illustrated in FIG. 1 can be a target object information stored in the mobile device 101, such as a target name, a target code, and a target title. Meanwhile, the target object O illustrated in FIG. 1 can be an itinerary information, a to-do information, a to-do list information, a file address information, a hyperlink, etc., but it should not be limited thereto. In addition, the target object O can also be a controlled device (not shown) that is connected to the communication unit 1013 of the mobile device 101 via the network N.

The network N illustrated in FIG. 1 can be, for example, a public or private network, such as a wireless network (such as 3G, 4G LTE, Wi-Fi), wired network, local area network (LAN), wide area network (WA) etc., but should not be limited thereto.

The server 102 illustrated in FIG. 1 can be an independent server computer that provides connection services, a virtual machine (VM) installed and running in the server computer, a server running in the form of a virtual private server, a public cloud, a private cloud, or an edge device, but it should not be limited thereto.

The processor 1012 illustrated in FIG. 1 may be one of a CPU, an MPU, an MCU, an application processor (AP), an embedded processor, and an ASIC.

The voice database 1021 and the tag database 1022 illustrated in FIG. 1 can be a physical database host, a cloud database, or a relational database or a non-relational database which are stored in the server 102 in the form of a plurality of tables, but they should not be limited thereto.

Figure 3:
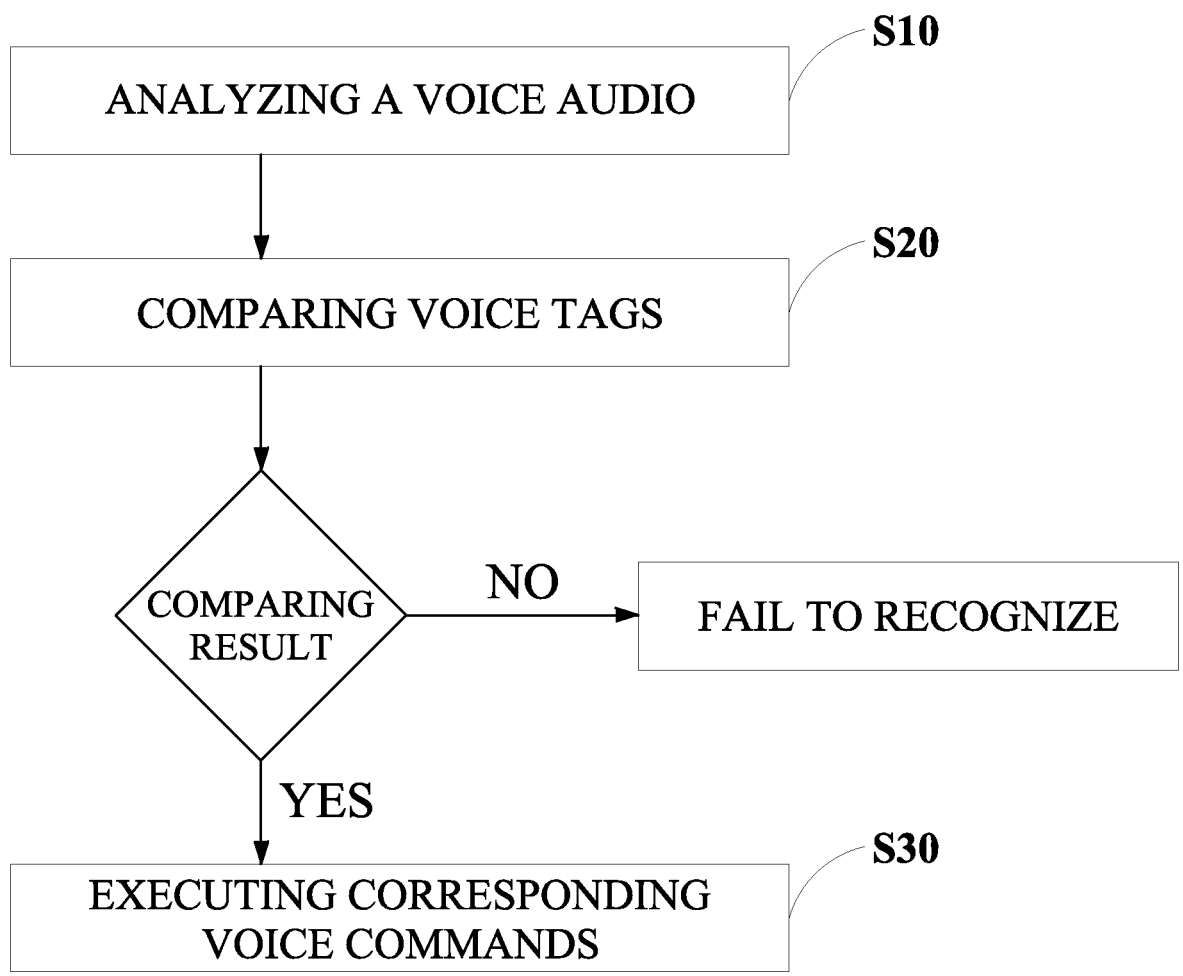
FIG. 3 is a flow chart of a method for controlling the intelligent voice system of the present disclosure.
Figure 4:
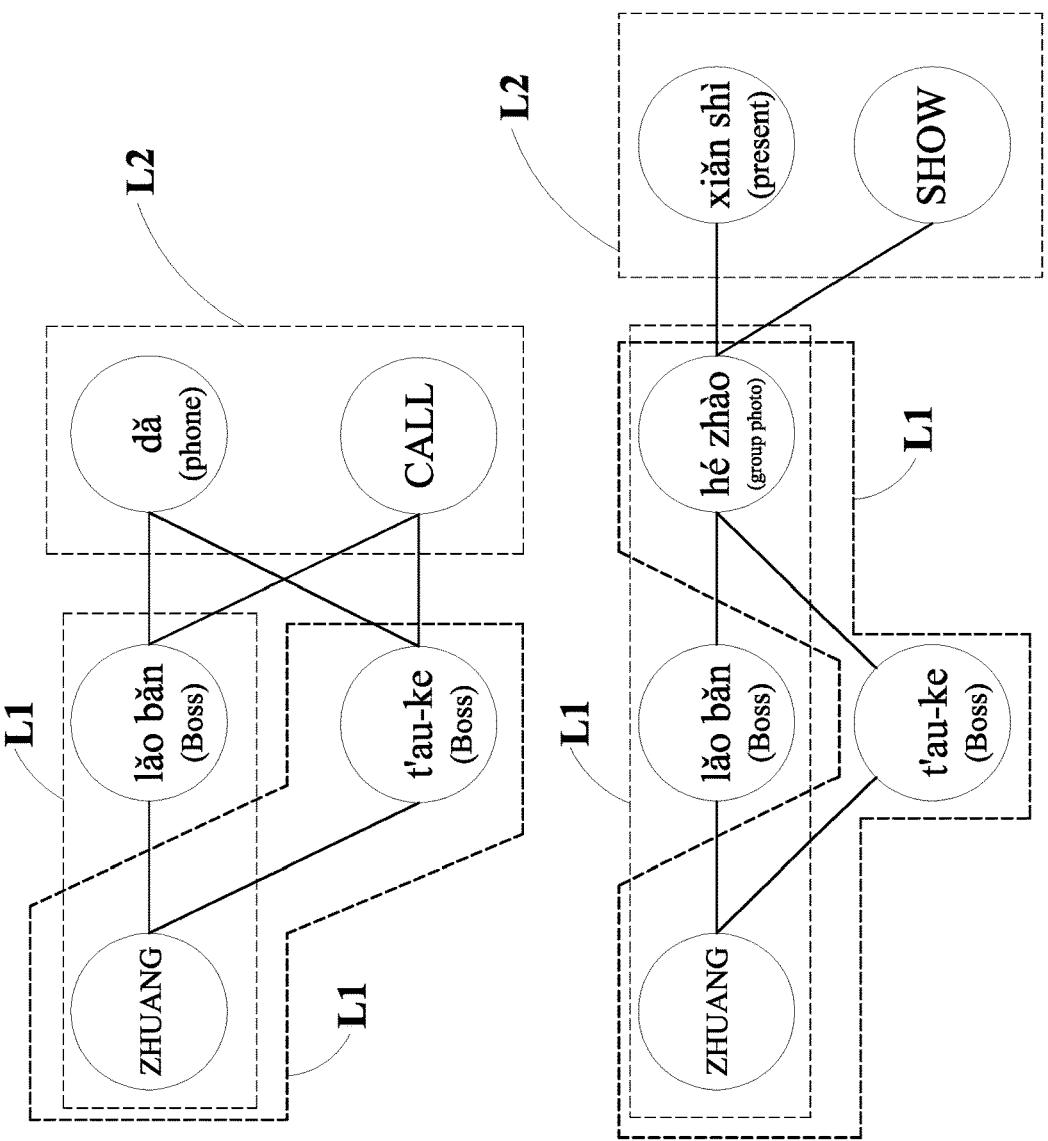
FIG. 4 is a schematic drawing of a step of analyzing voice audio of the present disclosure.

Referring to FIG. 3 together with FIG. 1 and FIG. 2, the barrier-free intelligent voice system 10 is suitable for analyzing a voice audio V, and includes a voice receiving unit 1011, a voice database 1021, a tag database 1022, a voice recognition unit 1023, and a processor 1012 of a mobile device 101. The method for controlling the barrier-free intelligent voice system includes following steps:

Step S10 of analyzing a voice audio:

The voice recognition unit 1023 performs a phonetic analysis on the voice audio V received by the voice receiving unit 1011 to identify a plurality of phones (voices). Thereafter, a morphological analysis is performed on the plurality of phones to identify a plurality of words that can be used as independent semantic units. For example, "shū that means for book in Chinese", "book", "nán hái that means for boy in Chinese", and "boy", etc. can all be considered as separate words. For this step, please refer to FIG. 4 in which a schematic diagram of the step of analyzing a voice audio. As shown in FIG. 4, the voice audio V received by the voice receiving unit 1011 may be, regardless of whether the plurality of phones is recognized as "zhuāng lǎo bǎn dǎ that means for Boss Zhuang phone in Chinese", "dǎ zhuāng lǎo bǎn that means for phone Boss Zhuang in Chinese", "zhuāng lǎo bǎn Call that means for Sir Zhuang call in a combination of Chinese and English", "call Boss Zhuang", "dǎ t'au-ke Zhuang that means for call Boss Zhuang in a combination of Chinese and Minnan language", "Chief Zhuang call", "Sir Zhuang phone", and regardless of whether the actual expression violates grammatical restrictions, recognized as being composed of "zhuāng lǎo bǎn that means for Boss Zhuang in Chinese" and "dǎ that means for phone in Chinese", "t'au-ke Zhuang that means for Boss Zhuang in Minnan language" and "dǎ that means for phone in Chinese", "Chief Zhuang" and "dǎ that means for phone in Chinese", "Boss Zhuang" and "dǎ diàn huà that means for call in Chinese", "zhuāng lǎo bǎn that means for Boss Zhuang in Chinese" and "call", "Sir Zhuang" and "call", and "Boss Zhuang" and "call". Similarly, when the voice audio V is recognized as "zhuāng lǎo ban hé zhào xiǎn shì that means for present group photo of Boss Zhuang in Chinese", "hé zhào zhuāng lǎo bǎn xiǎn shì that means for group photo of Boss Zhuang present in Chinese", "zhuāng lǎo bǎn hé zhào show that means for group photo of Sir Zhuang show in a combination of Chinese and English", "group photo of t'au-ke Zhuang xiǎn shì that means for show group photo of Sir Zhuang in a combination of Minnan language and English", "hé zhào t'au-ke Zhuang show that means for show group photo of Boss Zhuang in a combination of Chinese, Minnan language, and English", "group photo of Boss Zhuang show", "show group photo of Sir Zhuang", or "group photo of Sir Zhuang show", regardless of whether its expression violates the grammatical rules, it can be further recognized that it is composed of "zhuāng lǎo bǎn that means for Boss Zhuang in Chinese", "hé zhào that means for group photo in Chinese" and "xiǎn shì that means for present or show in Chinese"; "zhuāng lǎo bǎn that means for Boss Zhuang in Chinese", "group photo" and "present"; as well as "Boss Zhuang", "hé zhào that means for group photo in Chinese" and "show"; "t'au-ke Zhuang that means for Boss Zhuang in Minnan language", "hé zhào that means for group photo in Chinese" and "show". The above-mentioned is just an example, and should not be limited thereto.

Step S20 of comparing voice tags:

As shown in FIG. 4, the voice recognition unit 1023 can be connected to the tag database 1022 to determine whether the plurality of words are one of a plurality of target voice tags L1 defined by the mobile device 101 and whether they are one of a plurality of command voice tags L2 defined by the mobile device 101. More specifically, if the voice audio V can be recognized as plurality of words consisting of "zhu āng lǎo bǎn that means for Boss Zhuang in Chinese" and "dǎ that means for phone in Chinese", "t'au-ke Zhuang that means for Boss Zhuang in Minnan language" and "dǎ that means for phone in Chinese", "Boss Zhuang" and "dǎ diàn huà that means for call in Chinese", "zhuāng lǎo bǎn that means for Boss Zhuang in Chinese" and "call", and "t'au-ke Zhuang that means for Boss Zhuang in Minnan language" and "call" as an example, the voice recognition unit 1023 can find "zhuāng lǎo ban that means Boss Zhuang in Chinese" as the target voice tag L1 and find "dǎ that means for phone in Chinese", "call" or "phone" as command voice tag L2 through comparison in step S20, or the voice recognition unit 1023 can find "Sir Zhuang" as the target voice tag L1 and find "dǎ that means for phone in Chinese", "call" or "phone" as command voice tag L2 through comparison in step S20. Similarly, if the voice audio V can be recognized as plurality of words consisting of "zhuāng lǎo bǎn that means for Boss Zhuang in Chinese", "hé zhào that means for group photo in Chinese" and "xiǎn shì that means for present in Chinese"; "t'au-ke Zhuang that means for Boss Zhuang in Minnan language", "hé zhào that means for group photo in Chinese" and "xiǎn shì that means for present in Chinese"; or "zhuāng lǎo bǎn that means for Boss Zhuang in Chinese", "group photo" and "show" as an example, the voice recognition unit 1023 can find out "zhuāng lǎo ban hé zhào that means for group photo of Boss Zhuang in Chinese" or "group photo of Sir Zhuang" as the target voice tag L1 and find out "xiǎn shì that means for present in Chinese", "present" or "show" as command voice tag L2 through comparison in step S20. If the voice recognition unit 1023 finds out the corresponding target voice tag L1 and the corresponding command voice tag L2, then continue to step S30, if not, it means that the voice audio cannot be recognized, and step S10 or step S20 can be executed again.

Figure 5A:
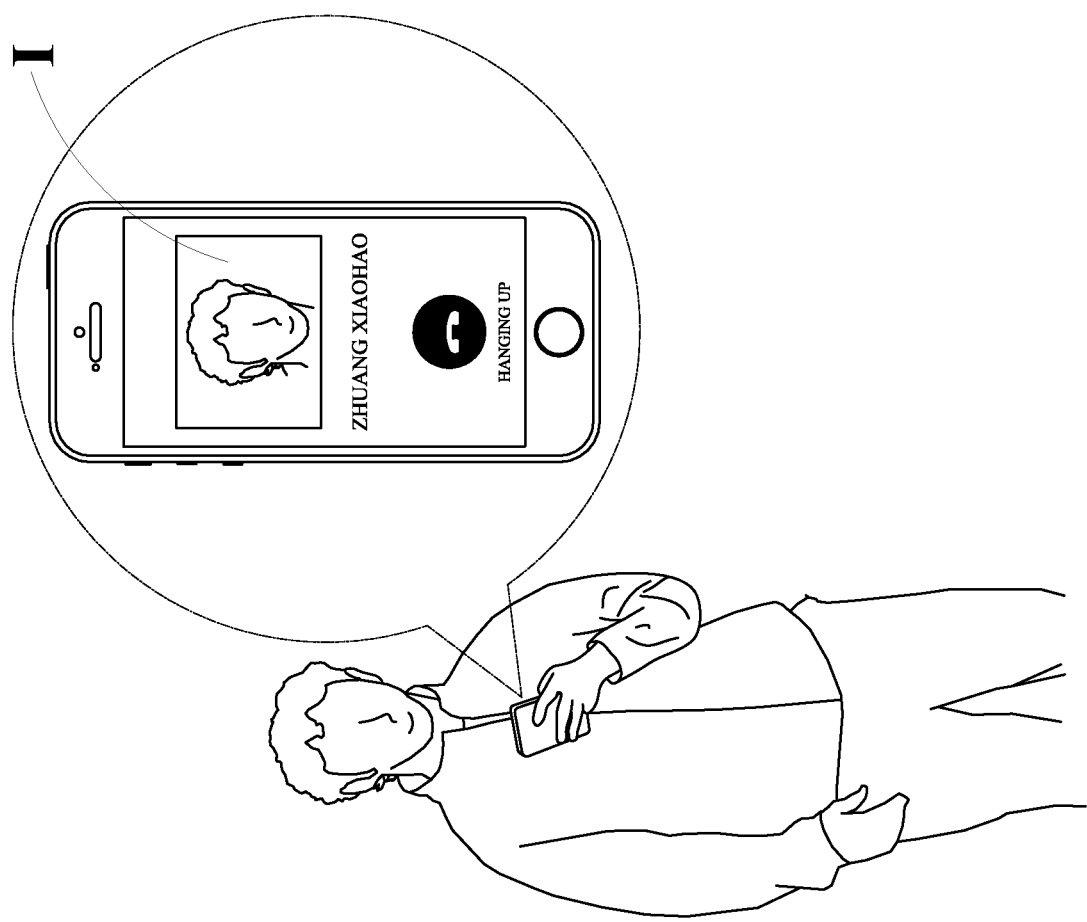
FIG. 5A is a schematic drawing I of the implementation state of the present disclosure.
Figure 5B:
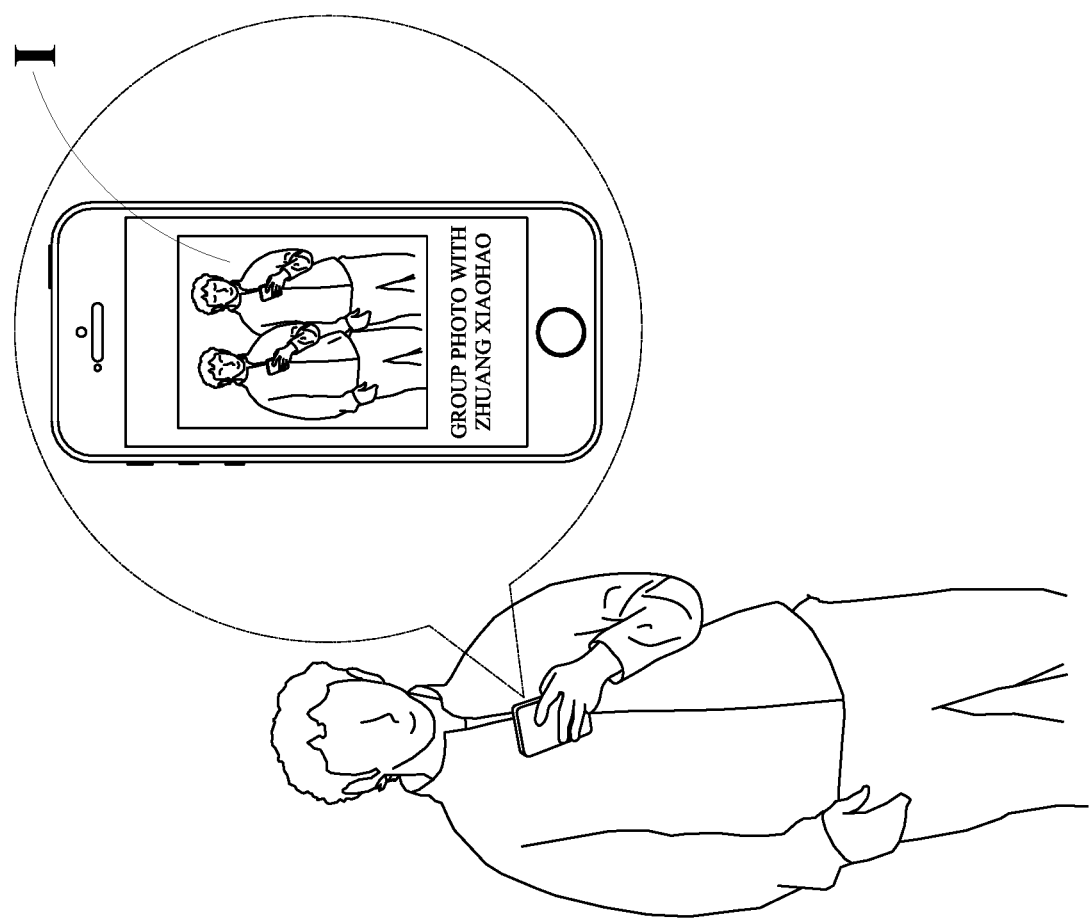
FIG. 5B is a schematic drawing II of the implementation state of the present disclosure.

Step S30 of executing corresponding voice commands:

According to the compared target voice tags L1 corresponding to a target object O in the tag database 1022 and according to the compared command voice tag L2 corresponding to a program command I in the tag database 1022, the processor 1012 of the mobile device 101 executes the program command I on the target object O. To be more specific, if the voice audio V can be recognized as the plurality of words consisting of "zhuāng lǎo bǎn that means for Boss Zhuang in Chinese" and "dǎ that means for phone in Chinese", "Boss Zhuang" and "telephone", or "zhuāng lǎo bǎn that means for Boss Zhuang in Chinese" and "call" as an example, the voice recognition unit 1023 can determine in the step S30 based on the compared target voice tag L1 "Boss Zhuang" whether it can correspond to the target object O "Zhuang Xiaohao's contact number" in the mobile device 101. At the same time, it can be determined that the compared command voice tag L2 "call" or "dǎ that means for phone in Chinese" can correspond to the program command I "execute a phone application (APP) installed on the mobile device 101 for the target object" and execute it (see FIG. 5A). When the voice audio V can be recognized as plurality of words consisting of "zhuāng lǎo bǎn that means for Boss Zhuang in Chinese", "hé zhào that means for group photo in Chinese" and "xiǎn shì that means for present in Chinese", or "zhuāng lǎo bǎn that means for Boss Zhuang in Chinese", "group photo" and "show" as an example, the voice recognition unit 1023 can determine based on the compared target voice tag L1 "Boss Zhuang group photo" whether it can correspond to the target object O "group photo with Zhuang Xiaohao" in the mobile device 101. At the same time, it can be determined that the compared command voice tag L2 "show" or "present" can correspond to the program command I "execute a photo viewer program installed on the mobile device 101" and execute it (see FIG. 5B).

Figure 6A:
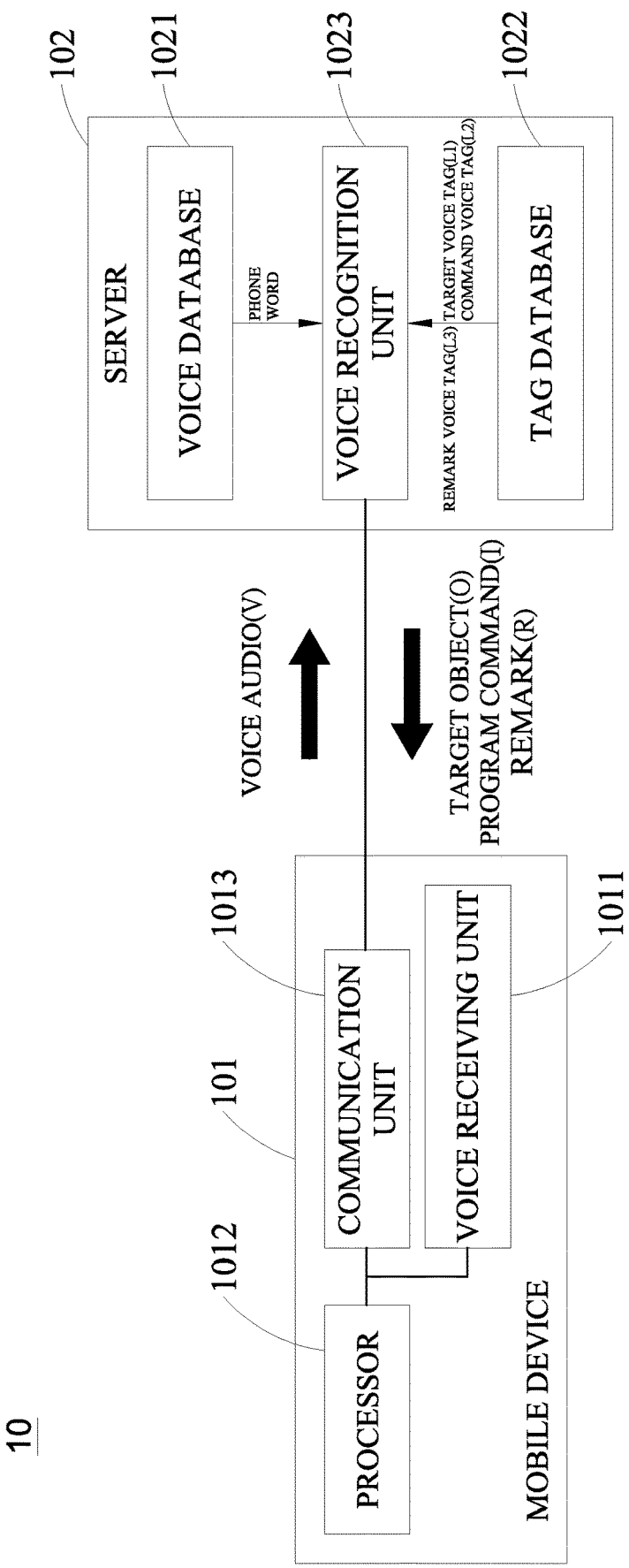
FIG. 6A is a schematic drawing of an information flow of the intelligent voice system according to another embodiment I of the present disclosure.
Figure 6B:
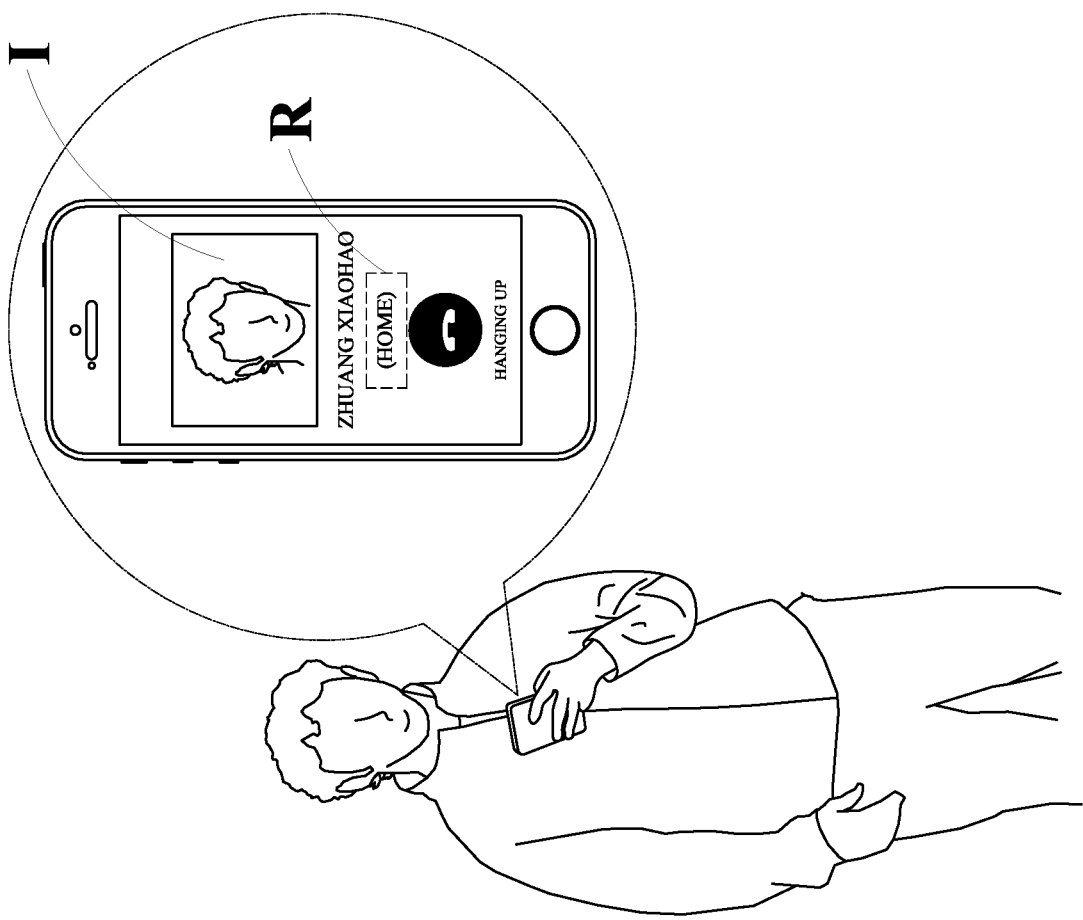
FIG. 6B is a schematic drawing I of the implementation state according to another embodiment I of the present disclosure.
Figure 6C:
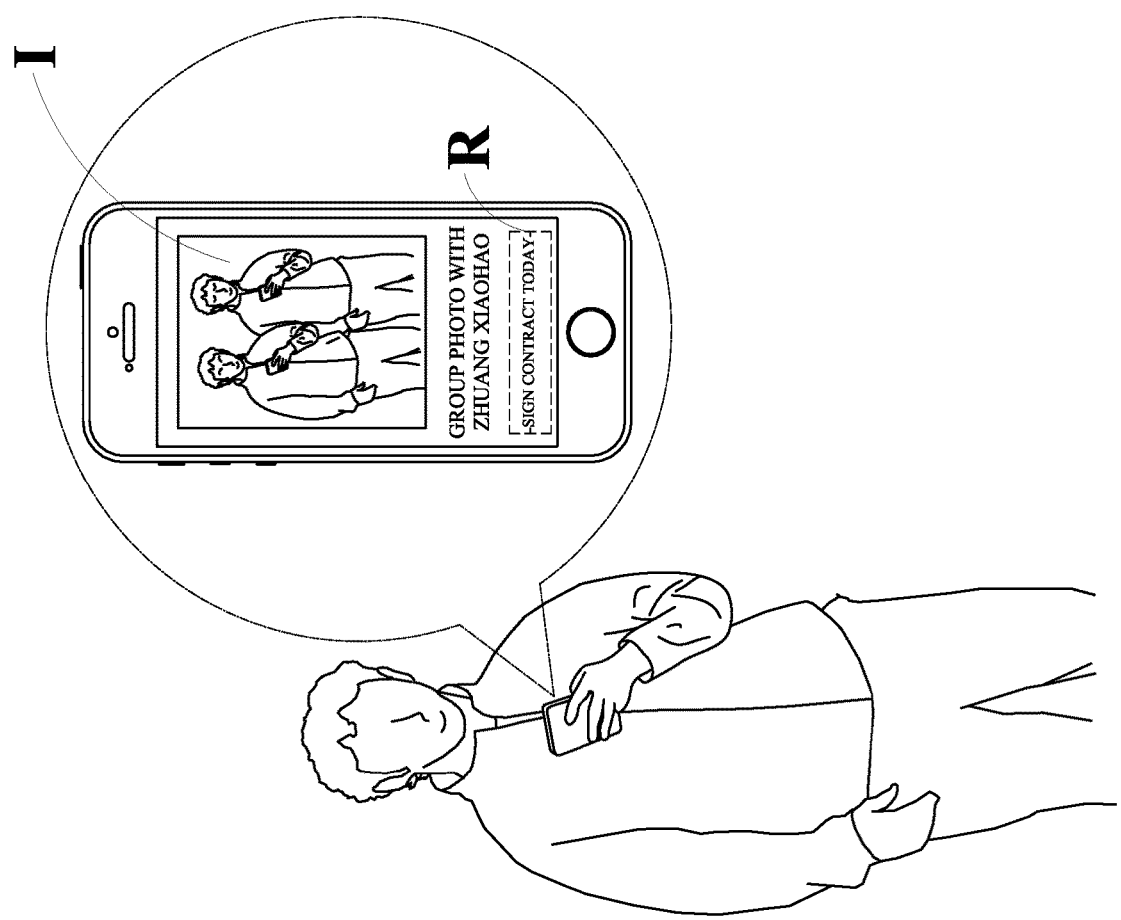
FIG. 6C is a schematic drawing II of the implementation state according to another embodiment I of the present disclosure.

Referring to FIGS. 6A through 6C and FIGS. 1 through 3, when the voice recognition unit 1023 executes the step S20 (of comparing voice tags), it can determine whether the plurality of words recognized from the voice audio V also include a remark voice tag L3 defined by the mobile device 101. If so, the processor 1012 of the mobile device 101 can adjust the content of the program command I or the target object O according to a remark R corresponding to the remark voice tag L3 in the tag database 1022. To be more specific, if the voice audio V is composed of plurality of words consisting of "zhuāng lǎo bǎn that means for Boss Zhuang in Chinese", "dǎ that means for phone in Chinese", and "zhù jiā that means for home in Chinese", or "zhuāng lǎo bǎn that means for Boss Zhuang in Chinese", "call", and "zhù jiā that means for house in Chinese" as an example, the voice recognition unit 1023 may find "Boss Zhuang" as the target voice tags L1, "phone" or "call" as the command voice tag L2, and "home" as the remark voice tag L3 through comparison in the step S20 of comparing voice tags. In this way, when the voice recognition unit 1023 executes the step S30 of executing corresponding voice commands, the voice recognition unit 1023 may determine according to the compared target voice tag L1 "Boss Zhuang" and the remark voice tag L3 "home" whether the voice audio V corresponds to the target object O "contact phone number of Zhuang Xiaohao's home" in the mobile device 101. According to the compared command voice tag L2 "dǎ that means for phone in Chinese", "call" or "phone", it can correspond to the program command I "to execute a phone application (APP) installed on the mobile device 101 for the target object", and it is then performed. FIG. 6B shows an example of the remark voice tag L3 that can adjust the content of the target object O. Similarly, in taking the plurality of words consisting of "Boss Zhuang", "group photo", "xiǎn shì that means for present in Chinese", and "say notes", or "Boss Zhuang", "group photo", "show", and "say remarks" as an example, the voice recognition unit 1023 can find out the target voice tag L1 "group photo of Boss Zhuang", the command voice tags L2 "xiǎn shì that means for present in Chinese" or "show", and the remark voice tag L3 "say notes" or "say remark" through comparison in step S20 (of comparing voice tags). In this way, when the voice recognition unit 1023 executes the step S30 of executing corresponding voice commands, the voice recognition unit 1023 determines whether the compared target voice tag L1 "group photo of Boss Zhuang" can correspond to the target object O "group photo with Zhuang Xiaohau" in the mobile device 101. At the same time, it can be determined that the compared command voice tag L2 "xiǎn shí that means for present in Chinese" or "show" and the compared remark voice tag L3 "say notes" or "say remark" correspond to the program command I "to execute a photo viewer program installed on the mobile device 101, and to play or present the information of note/remark associated with the target object", and then executes it. So far, as shown in FIG. 6C, it is an example of the remark voice tag L3 which may adjust the content of the program command I.

Figure 7:
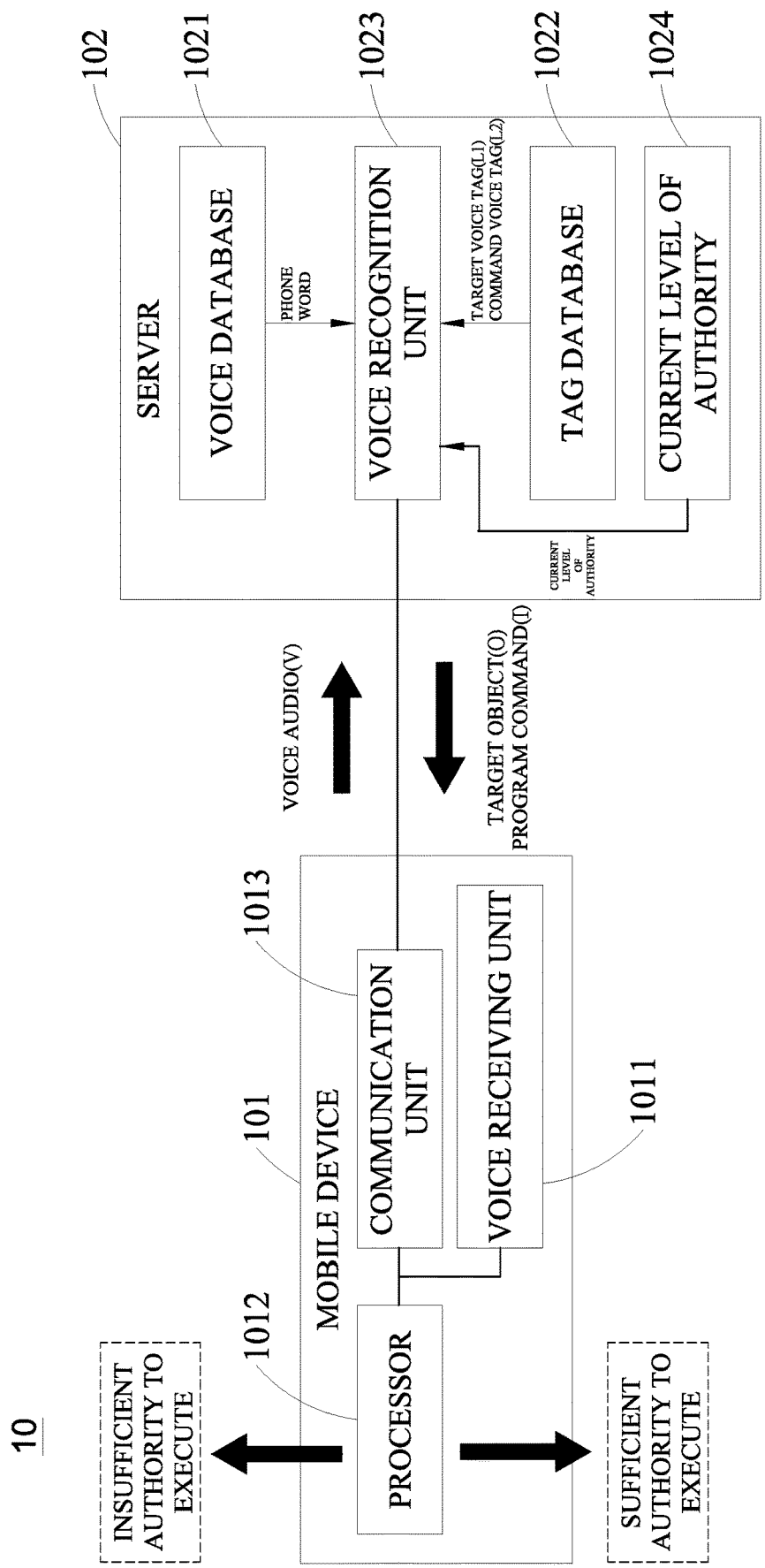
FIG. 7 is a block diagram of an intelligent voice system according to another embodiment II of the present disclosure.

The technique employed in FIG. 7 is similar to that employed in FIG. 1 through FIG. 3. The main difference lies in that the barrier-free intelligent voice system 10 of this embodiment further includes an authority verification unit 1024 storing a plurality of program commands and establishing an information link with the voice recognition unit 1023. The authority verification unit 1024 may determine a level of authority of the voice audio V based on the compared target voice tag L1 and the compared command voice tag L2 according to the result of reading over the tag database 1022 by the voice recognition unit 1023. Accordingly, the voice recognition unit 1023 determines whether the mobile device 101 can execute the program command I based on the current level of authority. In other words, the method S for controlling the barrier-free intelligent voice system of this embodiment may further include a step of verifying the use authority (step S25). The authority verification unit 1024 may determine a level of authority of the voice audio V based on the compared target voice tag L1 and the compared command voice tag L2 according to the result of reading over the tag database 1022 by the voice recognition unit 1023. In this way, it is determined whether the current level of authority of the mobile device 101 can execute the program commands I when the processor 1012 executes step 30 (of executing corresponding voice commands). For example, the authority verification unit 1024 determines that the target voice tag L1 and the command voice tag L2 corresponding to the voice audio V belong to a first level (the highest level) in the data table stored in the tag database 1022. In this case, the current level of authority of the mobile device 101 is determined as a holder level. When the level of authority of the program command I is the first level, it is determined that the mobile device 101 currently has the authority to execute the program command I. As for a second level and a third level of authority, for example, family users can not execute the program commands belonging to the first level. If the authority verification unit 1024 determines that the target voice tag L1 and the command voice tag L2 corresponding to the voice audio V belong to the second level in the data table stored in the tag database 1022, and when the level of authority of the program command I belongs to the third or second level, it is determined that the mobile device 101 currently has the authority to execute the program command I. If the authority verification unit 1024 determines that the target voice tag L1 and the command voice tag L2 corresponding to the voice audio V belong to the third level in the data table stored in the tag database 1022, and when the level of authority of the program command I belongs to the second level, it is determined that the mobile device 101 currently does not have the authority to execute the program command I, and so on.

Figure 8:
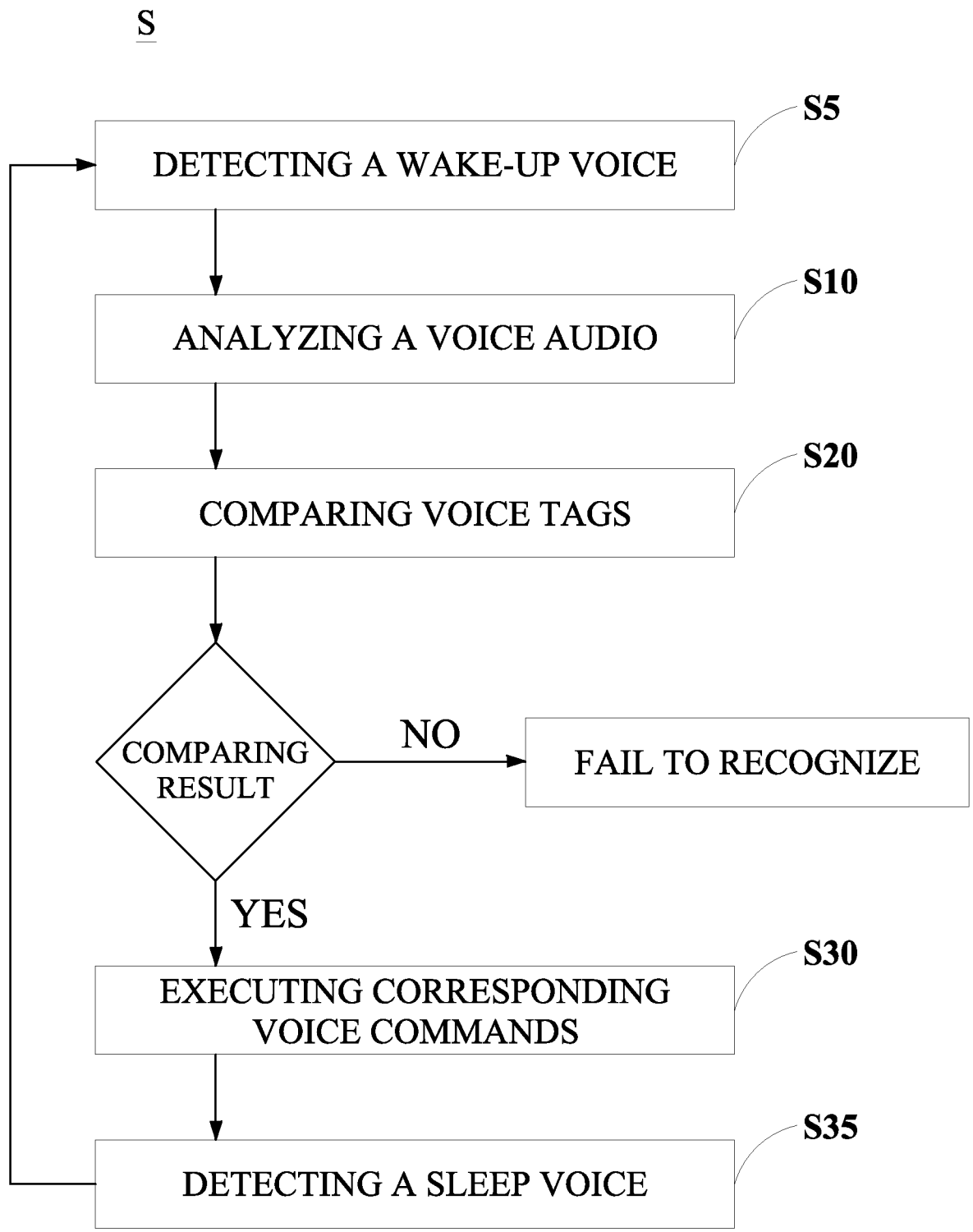
FIG. 8 is a flow chart of the method for controlling the intelligent voice system according to another embodiment III of the present disclosure.

The technique employed in FIG. 8 is similar to that employed in FIG. 1 through FIG. 3. The main difference lies in that the method S for controlling the barrier-free intelligent voice system of this embodiment further includes a step S5 of detecting a wake-up voice. The voice recognition unit 1023 first determines whether the voice receiving unit 1011 receives a predefined wake-up audio, for example, it receives wake-up audio such as "Xiaobai" and "Secretary". If yes, the wake-up audio is considered as a wake-up mode operation. Then, the step S10 (of analyzing a voice audio) is performed for phonetic analysis and morphological analysis on the voice audio V. Moreover, the method S for controlling the barrier-free intelligent voice system of this embodiment further includes a step S35 of detecting a sleep voice. The voice recognition unit 1023 determines whether the voice receiving unit 1011 receives a predefined sleep audio, for example, it receives sleep audio such as "Xiaobai off" and "secretary rest". If yes, the sleep audio can be considered as a sleep mode operation to stop performing the step S10 of analyzing a voice audio. It means to stop the phonetic analysis and the morphological analysis on the voice audio V, and only continue to perform step S5. In addition, the step S35 can also be executed after step S5, step S10, or step S20. It is not limited to the sequence illustrated in FIG. 8.

Figure 9:
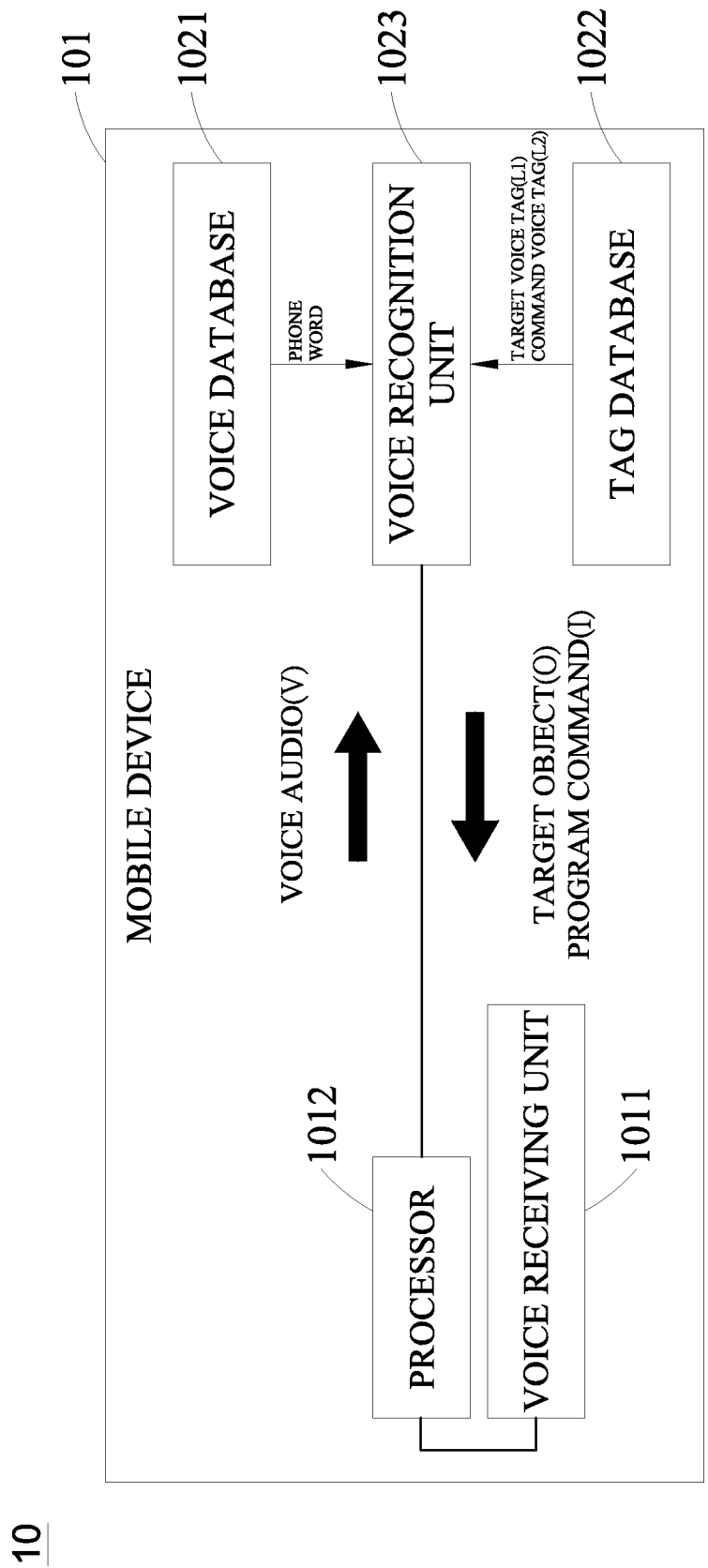
FIG. 9 is a block diagram of an intelligent voice system according to another embodiment IV of the present disclosure.

Referring to FIG. 9 together with FIG. 1 through FIG. 3, the barrier-free intelligent voice system 10, the voice database 1021, the tag database 1022, the voice recognition unit 1023, and the authority verification unit 1024 may be all installed in the mobile device 101. The barrier-free intelligent voice system 10 of the present disclosure allows the user to directly use the mobile device 101 to recognize and execute voice commands at the moment even if there is no communication network.

Figure 10:
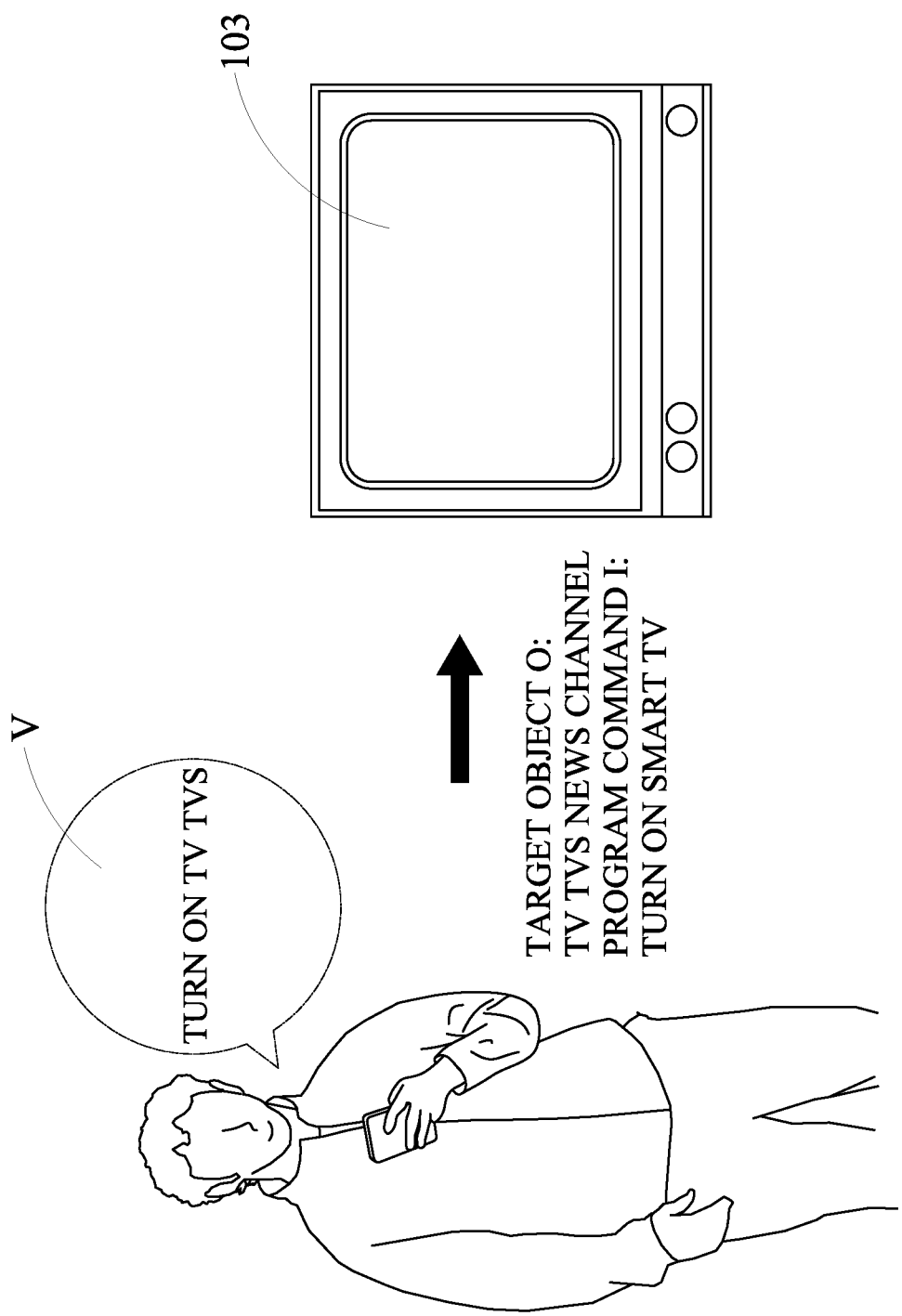
FIG. 10 is a schematic drawing of the implementation state according to another embodiment V of the present disclosure.

Referring to FIG. 10 together with FIG. 1 through FIG. 3 illustrating the barrier-free intelligent voice system 10, the target object O can be a controlled device 103, such as electric doors, lamps, televisions, electrical appliances, etc. other than the mobile device 101 when the voice recognition unit 1023 enables the processor 1012 of the mobile device 101 to execute the program command I on the target object O according to the compared target voice tag L1 corresponding to a target object O in the tag database 1022 and according to the compared command voice tag L2 corresponding to a program command I in the tag database 1022. For example, the user can operate the mobile device 101 to allow the voice receiving unit 1011 to receive the voice audio V, so that the voice audio V can be recognized by the voice recognition unit 1023 as being composed of plurality of words such as "turn on" (corresponding to the command voice tags L2) and "TV TVS" (corresponding to the target voice tag L1). Regardless of whether the grammatical structure of the voice audio V is correct, the voice recognition unit 1023 can further find out the target object O "TV TVS News Channel" corresponding to the target voice tag L1 and the program command I "The communication unit 1013 of the mobile device 101 turns on the smart TV wirelessly" corresponding to the command voice tag L2 through comparison. The above-mentioned is only an example and should not be limited thereto.

In addition, the present disclosure further discloses a computer program product capable of executing the method S for controlling the barrier-free intelligent voice system. When the computer system loads multiple program commands of the computer program product, at least steps S5, S10, S20, S25, S30, and S35 of the aforementioned method S for controlling the barrier-free intelligent voice system can be executed.

The present disclosure can achieve at least the following advantages:

1. Regardless of whether the grammatical rules of the voice audio are correct or not, the voice audio will be compared with the combination of voice tags created by the user (to represent the name, title, code, single or combined commands, programs, voice messages, recording messages, etc.), it can be readily recognized whether the voice audio can correspond to a target object and a program command. Compared with the conventional natural language understanding (NLU) or natural language processing (NLP), the present disclosure can effectively reduce the amount of calculations, increase the processing speed of the system, and minimize the system's judgment errors. Moreover, it can eliminate the differences in speech translation between different languages. At the same time, it is not limited by language, pitch, and timbre, so the present disclosure can recognize the audio of people with speech disabilities, and can also recognize the audio of normal people such as children, ordinary adults, and older people. Accordingly, the barrier-free use can be achieved.

2. The present disclosure compares the voice tag combination created by the user, can judge the current level of authority of the voice audio at the same time, and achieve the verification function similar to audio encryption. If the third party does not know the voice tag combination created by the user, and the voice audio is not from the original user, it is not possible to drive the mobile device to perform a specific function or activate the controlled devices other than the mobile device by emitting the voice audio.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

REFERENCE SIGN

1 barrier-free intelligent voice system
101 mobile device
1011 voice receiving unit
1012 processor
1013 communication unit
102 server
1021 voice database
1022 tag database
1023 voice recognition unit
1024 authority verification unit
103 controlled device
V voice audio
L1 target voice tag
O target object
L2 command voice tag
I program command
L3 remark voice tag
R remark
N network
S method for controlling the barrier-free intelligent voice system
S5 detecting a wake-up voice
S10 analyzing a voice audio
S20 comparing voice tags
S25 verifying the use authority
S30 executing corresponding voice commands
S35 detecting a sleep voice

What is claimed is:

1. A method for controlling a barrier-free intelligent voice system, the barrier-free intelligent voice system intended to analyze a voice audio and having a voice receiving unit, a voice database, a tag database, a voice recognition unit, an authority verification unit, and a processor of a mobile device, the method comprising steps of:

analyzing a voice audio, wherein the voice recognition unit is connected to the voice database, and perform a phonetic analysis on a voice audio received by a voice receiving unit to identify a plurality of phones therefrom, and then perform a morphological analysis on the plurality of phones to identify a plurality of words that can be used as independent semantic units;

comparing voice tags, wherein the voice recognition unit is connected to the tag database to determine whether the plurality of words are one of a plurality of target voice tags defined by a mobile device, and whether the plurality of words are one of a plurality of command voice tags defined by the mobile device; and executing a corresponding voice command, wherein, according to the compared target voice tag corresponding to a target object in the tag database and according to the compared command voice tag corresponding to a program command in the tag database, the processor enables the mobile device to execute the program command on the target object.

2. The method as claimed in claim 1 further comprising a step of detecting a wake-up voice, wherein the voice recognition unit determines whether the voice receiving unit receives a predefined wake-up audio, and if so, the wake-up audio is regarded as a wake-up mode operation, whereafter the step of analyzing a voice audio is performed on the voice audio.

3. The method as claimed in claim 1, wherein, when the step of comparing voice tags is executed, the voice recognition unit determines whether the plurality of words recognized from the voice audio also include a remark voice tag defined by the mobile device, and wherein if it is the case, then the processor adjusts a content of the program command or a content of the target object which are related to a remark corresponding to the remark voice tag in the tag database.

4. The method as claimed in claim 1 further comprising a step of step of verifying the use authority, wherein an authority verification unit judges a level of authority of the voice audio according to the compared target voice tags and the compared command voice tags to determine whether the mobile device can execute the program command based on the current level of authority when the processor performs the step of executing corresponding voice commands.

5. The method as claimed in claim 1 further comprising a step of detecting a sleep voice, wherein the voice recognition unit determines whether the voice receiving unit receives a predefined sleep audio, and if it is the case, the sleep audio is regarded as a sleep mode operation, and stops performing the step of analyzing a voice audio step on the voice audio again.

6. A barrier-free intelligent voice system, comprising:
   a voice receiving unit establishing an information link with a processor of a mobile device to receive a voice audio;
   a communication unit establishing an information link with the processor;
   a voice database storing a plurality of voice audio samples;
   a tag database storing a plurality of target voice tags and command voice tags;
   a voice recognition unit establishing an information link with the communication unit, the voice database, and the tag database, the voice recognition unit being provided for receiving the voice audio sent by the voice receiving unit, performing a phonetic analysis on the voice audio to identify a plurality of phones according to a result of reading over the voice database, and performing a morphological analysis on the phones to identify a plurality of independent words;
   wherein the voice recognition unit also, according to the result of reading over the tag database, determine whether the plurality of words are one of the plurality of target voice tags defined by the mobile device and whether the plurality of words are one of the plurality of command voice tags defined by the mobile device; and
   wherein the voice recognition unit may, according to the compared target voice tag corresponding to a target object in the tag database and according to the compared command voice tag corresponding to a program command in the tag database, enable the processor of the mobile device via the communication unit to execute the program command on the target object.

7. The system as claimed in claim 6, wherein the voice recognition unit is also used to determine whether the voice receiving unit receives a pre-defined wake-up audio and a sleep audio, and wherein if the wake-up audio is received, the phonetic analysis and the morphological analysis are performed on the voice audio, and wherein, after receiving the sleep audio, the phonetic analysis and the morphological analysis are not performed on the voice audio again.

8. The system as claimed in claim 6, wherein the voice recognition unit is also used to determine based on the result of reading over the tag database whether the plurality of words recognized from the voice audio also include a remark voice tag defined by the mobile device, and wherein, if it is the case, the processor of the mobile device may adjust a content of the program command or a content of the target object which are related to a remark corresponding to the remark voice tag in the tag database.

9. The system as claimed in claim 6, further comprising an authority verification unit in an information link with the voice recognition unit, and wherein the authority verification unit judges a level of authority of the voice audio according to the compared target voice tags and the compared command voice tags for the voice recognition unit to determine whether the processor of the mobile device may execute the program command based on the current level of authority.

10. A barrier-free intelligent voice system, intended to a mobile device having a processor, comprising:
    a voice receiving unit establishing an information link with the processor to receive a voice audio;
    a voice database storing a plurality of voice audio samples;
    a tag database storing a plurality of target voice tags and command voice tags;
    a voice recognition unit establishing an information link with the voice database and the tag database, the voice recognition unit being provided for receiving the voice audio sent by the voice receiving unit, performing a phonetic analysis on the voice audio to identify a plurality of phones according to a result of reading over the voice database, and performing a morphological analysis on the phones to identify a plurality of independent words;
    wherein the voice recognition unit also, according to the result of reading over the tag database, determine whether the plurality of words are one of the plurality of target voice tags defined by the mobile device and whether the plurality of words are one of the plurality of command voice tags defined by the mobile device; and
    wherein, if it is the case, the voice recognition unit, according to the compared target voice tag corresponding to a target object in the tag database and according to the compared command voice tag corresponding to a program command I in the tag database, enables the processor of the mobile device to execute the program command I on the target object.

* * * * *